(12) United States Patent
Righetti et al.

(10) Patent No.: US 12,539,104 B2
(45) Date of Patent: Feb. 3, 2026

(54) NON-INVASIVE ASSESSMENT OF INTERSTITIAL FLUID PRESSURE (IFP), INTERSTITIAL FLUID VELOCITY (IFV) AND FLUID FLOW INSIDE TUMORS

(71) Applicant: The Texas A&M University System, College Station, TX (US)

(72) Inventors: Raffaella Righetti, College Station, TX (US); Md Tauhidul Islam, College Station, TX (US)

(73) Assignee: The Texas A&M University System, College Station, TX (US)

( * ) Notice: Subject to any disclaimer, the term of this patent is extended or adjusted under 35 U.S.C. 154(b) by 532 days.

(21) Appl. No.: 17/275,261

(22) PCT Filed: Sep. 27, 2019

(86) PCT No.: PCT/US2019/053500
§ 371 (c)(1),
(2) Date: Mar. 11, 2021

(87) PCT Pub. No.: WO2020/069343
PCT Pub. Date: Apr. 2, 2020

(65) Prior Publication Data
US 2021/0321987 A1  Oct. 21, 2021

Related U.S. Application Data

(60) Provisional application No. 62/737,700, filed on Sep. 27, 2018, provisional application No. 62/737,694, filed on Sep. 27, 2018.

(51) Int. Cl.
*A61B 8/00* (2006.01)
*A61B 8/08* (2006.01)

(52) U.S. Cl.
CPC .............. *A61B 8/485* (2013.01); *A61B 8/085* (2013.01)

(58) Field of Classification Search
CPC ......... A61B 8/485; A61B 8/5223; A61B 5/03; G06T 2207/30096
See application file for complete search history.

(56) References Cited

U.S. PATENT DOCUMENTS

| | | |
|---|---|---|
| 2005/0049497 A1 | 3/2005 | Krishnan et al. |
| 2007/0270694 A1 | 11/2007 | Pelissier et al. |

(Continued)

FOREIGN PATENT DOCUMENTS

| | | |
|---|---|---|
| CA | 2786368 A1 | 2/2014 |
| WO | 2020069343 A1 | 4/2020 |

*Primary Examiner* — Rajeev P Siripurapu

(57) ABSTRACT

The disclosure provides a method, a system, an apparatus, and a computer program product for determining IFP, IFV, and fluid flow inside tumors. In one example, a method for estimating tumor parameters is disclosed. This method includes: (1) receiving image data from a tumor, (2) obtaining strain data of the tumor from the image data, and (3) determining a tumor parameter, such as IFP and IFV, employing the strain data and an analytical model. Additional tumor parameters can be determined employing the strain data and other analytical models. The additional tumor parameters include compression-induced fluid pressure, velocity and flow inside the tumor, parameter α employing the fluid pressure, the ratio between vascular permeability and interstitial permeability, and the ratio of peak IFP and effective vascular pressure. Each of these parameters can be employed for analyzing, monitoring, treating, testing, etc., tumors or the effects of drugs on the tumors.

20 Claims, 4 Drawing Sheets

(56) References Cited

U.S. PATENT DOCUMENTS

2014/0288424 A1* 9/2014 Mukdadi .............. A61B 8/5223
600/438
2020/0167926 A1* 5/2020 Dadiani ................. G06T 5/002

\* cited by examiner

NON-INVASIVE ASSESSMENT OF INTERSTITIAL FLUID PRESSURE (IFP), INTERSTITIAL FLUID VELOCITY (IFV) AND FLUID FLOW INSIDE TUMORS

CROSS-REFERENCE TO RELATED APPLICATION

This application is the National Stage of, and therefore claims the benefit of, International Application No. PCT/US2019/053500 filed on Sep. 27, 2019, entitled "NON-INVASIVE ASSESSMENT OF INTERSTITIAL FLUID PRESSURE (IFP), INTERSTITIAL FLUID VELOCITY (IFV) AND FLUID FLOW INSIDE TUMORS," which was published in English under International Publication Number WO 2020/069343 on Apr. 12, 2020, and claims the benefit of U.S. Provisional Application Ser. No. 62/737,694, filed by Raffaella Righetti, et al. on Sep. 27, 2018, and U.S. Provisional Application Ser. No. 62/737,700, filed by Raffaella Righetti, et al. on Sep. 27, 2018, wherein the above applications are commonly assigned with this National Stage application and are incorporated herein by reference in their entirety.

TECHNICAL FIELD

This application is directed, in general, to estimating tumor parameters and, more specifically, to the non-invasive assessment of mechanical and transport parameters inside tumors.

BACKGROUND

Understanding mechanical and transport parameters of tumors can be beneficial in treating patients. For example, interstitial fluid pressure (IFP) is a parameter which can be useful in the diagnosis, prognosis and treatment of cancers. IFP is an influential component of the cancer microenvironment that plays a key role in cancer initiation, growth and metastasis. Interstitial fluid velocity (IFV) is another parameter, which is related to the IFP, that significantly affects the metastatic nature of the cancer and the effectiveness of drug delivery therapies in the cancer.

The spatial distribution parameter α and temporal distribution of the IFP and the IFV inside tumors are also valuable parameters that can be useful in understanding tumors. Rate of fluid flow inside tumors can indicate the status of lymphatic and capillary channels and thus is an important parameter for characterization of the tumor microenvironment. The status of lymphatic and capillary channels can be used by clinicians to determine the optimum size of drug molecules in treatments. Spatial and temporal distributions of IFP and IFV in cancers can be used to personalize cancer regimens.

Though a few contrast-based MRI and optical methods have been proposed to measure IFP/IFV in tissues, the values obtained from these methods can be unreliable. These methods are also expensive, non-portable, and require using imaging contrast agents. Additionally, reliable noninvasive methods to assess and monitor the spatial and temporal distribution of IFP, IFV, and fluid flow inside a tumor as it progresses, or with treatment administration, do not appear to exist.

BRIEF DESCRIPTION

Reference is now made to the following descriptions taken in conjunction with the accompanying drawings, in which.

DETAILED DESCRIPTION

Figure 1:
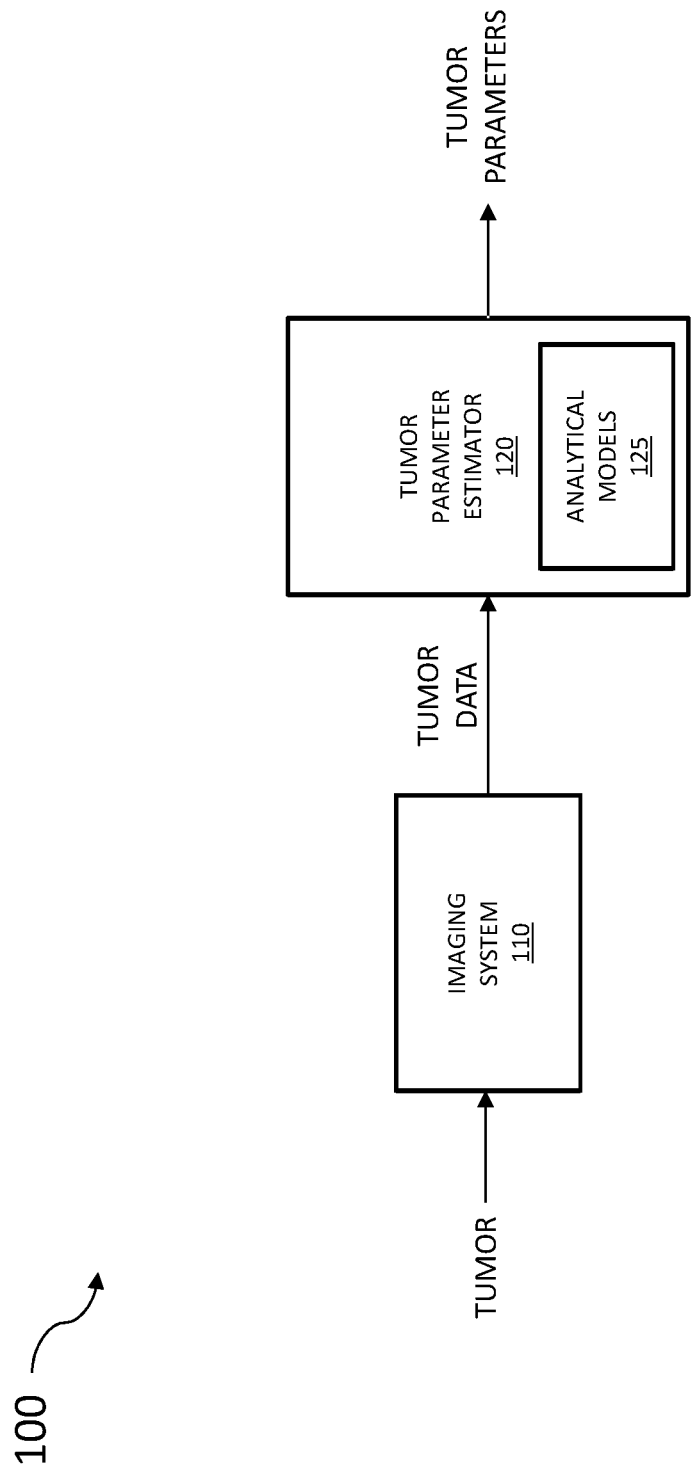
FIG. 1 illustrates a block diagram of an example of a diagnostic system constructed according to the principles of the disclosure.

Included herein are techniques or methods to estimate tumor parameters using strain data from the tumor. Techniques disclosed herein use the strain data and analytical models to provide new, non-invasive tools to assess parameters of tumors and fluid transport in tumors. Techniques disclosed herein include obtaining strain data from a tumor using an imaging method. The strain data of a tumor can also be obtained employing other methods used in the art. A tumor is a mass of tissue that can be benign or malignant. As such, the tumor can be a cancerous tumor. The tumor can be from a sample that has been removed from a host or can still be with the host, i.e., unremoved. Accordingly, the data can be acquired employing ex vivo or in vivo measurements. The host can be a human or an animal. The imaging method provides image data of a tumor that corresponds to parameters of the tumor. From the acquired image data, the various parameters can be determined using the developed analytical models. The imaging method can be ultrasound, magnetic resonance imaging (MRI), optics, photoacoustic imaging, etc. In some embodiments disclosed herein, ultrasound is used as the imaging method. Acquiring the data from the imaging method can be part of a treatment or can be part of a testing process. For example, the image data can be obtained as part of a process to test the effect of drugs on a tumor.

The imaging method can be performed as part of an examination typically executed in clinical settings. Acquiring the data can include compressing the tissue for a designated amount of time, while the imaging probe is in contact with the tissue. The compression time can vary depending on, for example, the imaging method and the tumor properties. Ultrasound elastography is an example of an imaging modality where compression is applied on a sample tissue and strain data is measured. Normal strain data of a tumor can be obtained from ultrasound elastography and employed in disclosed analytical models to estimate the IFP and IFV of the tumor. The analytical models can be used with specific experimental set-ups, including but not limited to creep compression, stress relaxation, and sinusoidal excitations. For example, an analytical model can be used for tumors surrounded by background tissues wherein interstitial fluid parameters (IFP and IFV) are estimated using the strain data from the ultrasound experiment.

In addition to the IFP and IFV, estimating the magnitude and spatial distribution of fluid pressure, fluid velocity and average fluid flow inside tumors using data from imaging methods is also disclosed. Analytical models disclosed herein reflect that the estimated parameters (e.g., fluid pressure, velocity and flow) as a result of compression in an imaging method such as ultrasound elastography are directly related to the underlying IFP, IFV and average internal fluid flow inside the tumor, respectively, differing only in peak values. Additionally, from the spatial distribution of the fluid pressure obtained from the imaging data, for example elastographic data, it is possible to estimate the spatial distribution parameter ($\alpha$) of the IFP, the ratio between the vascular permeability and interstitial permeability, and the ratio between the peak IFP and effective vascular pressure in the tumor. As such, the analytical models can be represented by algorithms specifically designed to obtain the link between the fluid pressure, velocity and flow in image data with the IFP, IFV and fluid flow inside tumors.

The advantages offered by the disclosed techniques include non-invasiveness, low cost, safety, non-radiation, portability, computational efficiency, etc., and thus may be the preferable technique for clinicians. The disclosed non-invasive technique can be integrated into multiple platforms such as computer program products, imaging systems, or dedicated devices, such as lab devices or lab equipment. Therefore, the technology can be made readily available for clinical applications in diagnostic systems, commercialized as a software package, and manufactured in a portable diagnostic and/or therapeutic device. For example, a lab device can be configured, i.e., designed and constructed, to employ the disclosed technology to test the efficacy of a drug or drugs on a tumor.

FIG. 1 illustrates a block diagram of an example of a diagnostic system 100 constructed according to the principles of the disclosure. The diagnostic system 100 includes an imaging system 110 and a tumor parameter estimator 120. The imaging system 110 and the tumor parameter estimator 120 can be located in separate computing devices as illustrated. In some examples, the imaging system 110 and the tumor parameter estimator 120 can be integrated in a single computing device.

The imaging system 110 is configured to acquire data of a tumor non-invasively. The imaging system 110 can be an ultrasound system. For example, the ultrasound system can have a single element, linear or two-dimensional transducers for obtaining data. In one example, ultrasound elastography is used to obtain the data. Other imaging systems, such as photoacoustic imaging, can also be employed.

The tumor parameter estimator 120 is configured to calculate parameters of the tumor employing strain data of the tumor and an analytical model or models 125. The strain data can be determined from the image data provided by the imaging system 110. The strain data can also be provided by other conventional methods or procedures. Various methods can be employed for obtaining the strain data, such as sample tracking, correlation, optical flow estimation, block matching, Doppler-based processing, etc. The strain data can be the axial, lateral, elevational, or volumetric strain data. The analytical models 125 relate the tumor parameters to the strain data. The tumor parameters can be IFP, IFV or compression induced fluid pressure, spatial parameter $\alpha$, fluid velocity, fluid flow, ratio between peak IFP and effective vascular pressure, and vascular permeability over interstitial permeability ratio. The analytical models 125 can be represented as an algorithm or algorithms in software that are employed in a computing device or a processor thereof to determine the tumor parameters. The analytical models 125 can be represented by the equations presented below. Once the tumor parameters are determined, the parameters can be employed for various medical or research processes and procedures, such as the diagnosis, prognosis and treatment of cancers, and the testing of drugs. As such, the tumor parameters can be employed for the benefit of the host, others, or both. An example of equations that can be used for the analytical models 125 are provided below. The analytical models 125 can be located in a data storage of the tumor parameter estimator 120.

The volumetric strain inside a tumor at steady state, when the tissue is relaxed, is represented by Equation 1 below assuming there is zero IFP at the tumor boundary.

$$\epsilon_i(R) = \frac{\sigma_T - P_e(R)}{K_e} \quad \#(1)$$

where, R is the radial coordinate, $P_e$ is the IFP and effective compression modulus $$K_e = \frac{E_e}{3(1 - 2\nu_e)}.$$

Here, $E_e$ and $\nu_e$ are the effective Young's modulus and effective Poisson's ratio at steady state.

Eshelby's inclusion formulation can be used to calculate the volumetric stress ($\sigma_T$) and axial stress ($\sigma_a$) inside the tumor from the applied load $\sigma_0$, the Young's moduli and Poisson's ratios of the inclusion and background. The effective Young's modulus, $E_e = \sigma_a/\epsilon_{yy}$ and effective Poisson's ratio $\nu_e = \epsilon_{xx}/\epsilon_{yy}$. Here, $\epsilon_{yy}$ and $\epsilon_{xx}$ are measured axial and lateral strains inside the tumor that can be obtained from the image data.

Using Equation 1, the IFP can be written as Equation 2

$$P_e(R) = \sigma_T - K_e \epsilon_i(R) \quad \#(2)$$

Regarding the IFV, $V_e$ can be related to the gradient of the IFP along radial direction as represented in Equation 3 below, wherein k is the interstitial permeability of the tumor. k can be determined using methods available in the art.

$$V_e(R) = -k \frac{dP_e(R)}{dR} \quad \#(3)$$

For the compression induced fluid pressure inside the tumor at time t, Equation 4 presented below can be used.

$$p(R,t) = -K(\epsilon(R,t) - \epsilon(R,\infty)) \quad \#(4)$$

where t is a specific time point, $\epsilon(R, \infty)$ denotes the volumetric strain at steady state, and K is the compression modulus, $$K = \frac{E}{3(1 - 2\nu)}.$$

Here E and $\nu$ are the Young's modulus and Poisson's ratio of tumor and can be determined using available methods known in the art.

A spatial parameter $\alpha$ can be determined employing Equation 5 below.

$$p(R) = \Omega\left(1 - \frac{\sinh(\alpha R)}{R \sinh \alpha}\right), \text{ where } \alpha = a\sqrt{\frac{L_p}{k}\frac{S}{V}} \quad \#(5)$$

Here $\Omega$ is related to the peak fluid pressure $P_0$, i.e., $P_0 = \Omega (1 - \alpha \operatorname{cosec}(\alpha))$, a is the tumor radius, $L_p$ is the vascular permeability, k is the interstitial permeability and $$\frac{S}{V}$$

is the surface area to volume ratio inside tumors.

$$\frac{S}{V}$$

can be determined using methods available in the art. By knowledge of α, the ratio between vascular permeability and interstitial permeability $$\frac{L_p}{k}$$

can also be determined using Equation 5.

Ratio between peak IFP and effective vascular pressure can be estimated using Equation 6.

$$\frac{P_{i0}}{P_e} = 1 - \alpha \operatorname{cosec}(\alpha) \qquad \#(6)$$

Fluid velocity can be estimated by using Equation 7.

$$v_R = -\frac{dp(R, t)}{dR} \qquad \#(7)$$

Fluid flow can be determined by using Equation 8.

$$w = \frac{d\epsilon}{dt} \qquad \#(8)$$

Figure 2:
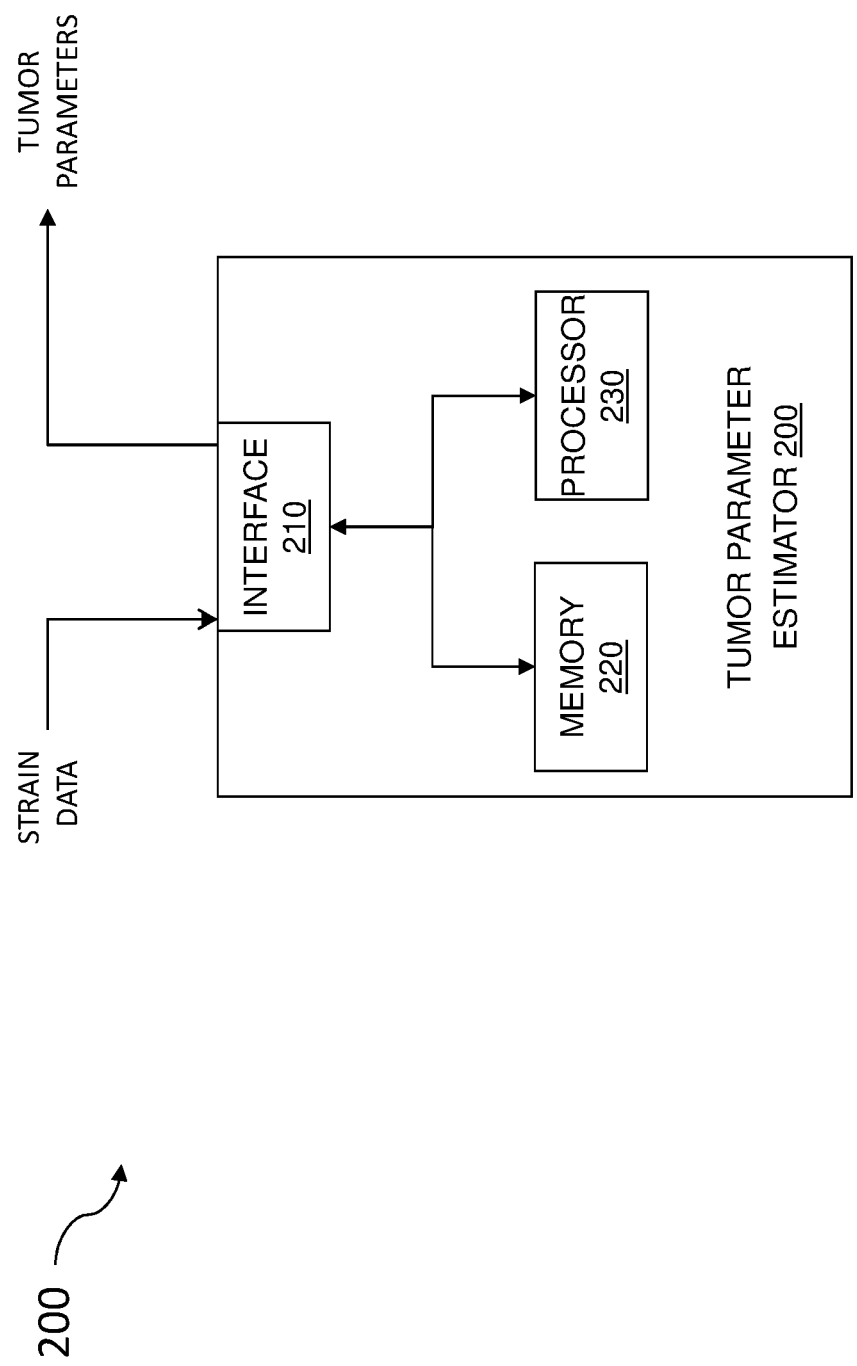
FIG. 2 illustrates a block diagram of an example of a tumor parameter estimator constructed according to the principles of the disclosure.

FIG. 2 illustrates a block diagram of an example of a tumor parameter estimator 200 constructed according to the principles of the disclosure. The tumor parameter estimator 200 is configured to calculate tumor parameters of the cancer employing strain data and analytical models. The tumor parameter estimator 200 can be integrated on one or more computing devices or systems. Thus, functions performed by the tumor parameter estimator 200 can be distributed to different computing devices or systems. For example, some of the functions performed by the tumor parameter estimator 200 can be performed by a computing device located at a clinic or lab, and other functions can be performed at a data processing center, a computing facility, or another suitable location. As such, the tumor parameter estimator 200 can be implemented on a server, a cloud service, a tablet, a laptop, a smartphone, other types of computing systems, or a combination thereof.

The tumor parameter estimator 200 includes an interface 210, a memory 220, and a processor 230. The interface 210 is a component or device interface configured to receive strain data of a tumor and provide parameters of the tumor determined by the tumor parameter estimator 200. The strain data can be obtained from an imaging system or obtained from image data from the imaging system. In some applications, the tumor parameter estimator 200 can receive the strain data from an imaging system. The strain data can be obtained via other non-imaging methods.

The tumor parameters can be sent to a storage device, such as a digital memory storage, provided to a user, such as a clinician, by sending the tumor parameters to a user interface, such as a display, or sent to another computing device. The computing device can be remote from the tumor parameter estimator 200, such as a cloud server connected via a communications network, or proximate the tumor parameter estimator 200. The interface 210 can be a conventional interface that communicates data according to standard protocols. As such, the interface 210 is configured to communicate data, i.e., transmit and receive data. Accordingly, the interface 210 includes the necessary logic, ports, terminals, connectors, etc., to communicate data. The ports, terminals, connectors, may be conventional receptacles for communicating data via a communications network.

The memory 220 is configured to store the analytical models and algorithms employed to determine the tumor parameters from the strain data. Additionally, the memory 220 is configured to store a series of operating instructions that direct the operation of the processor 230 when initiated. At least a portion of the operating instructions can correspond to the analytical models disclosed herein. The memory 220 is a non-transitory computer readable medium.

As such, the memory 220 is a data storage configured to store computer executable instructions to direct the operation of the processor 230 when initiated thereby. The memory can be a non-volatile memory. The memory 220 can also store data, such as the strain data. The operating instructions may correspond to algorithms that provide the functionality of the techniques or schemes disclosed herein. For example, the operating instructions may correspond to the algorithm or algorithms that, when executed, determine tumor parameters from strain data.

The processor 230 is configured to direct the operation of the tumor parameter estimator 200. As such, the processor 230 includes the necessary logic to communicate with the interface 210 and the memory 220 and perform the functions described herein to determine parameters of a tumor from strain data obtained from the tumor.

Figure 3:
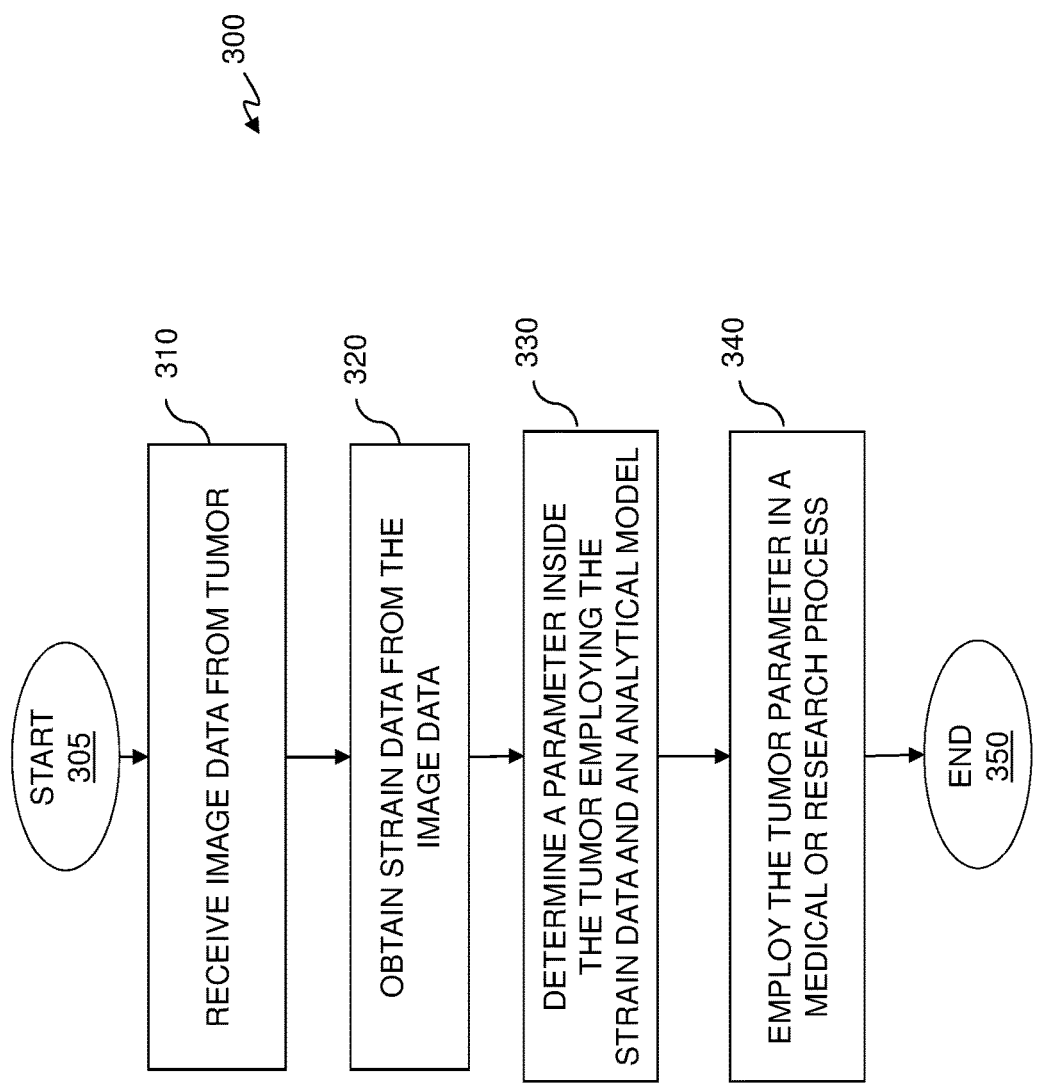
FIG. 3 illustrates a flow diagram of an example of a method that includes estimating parameters inside tumors carried out according to the principles of the disclosure.

FIG. 3 illustrates a flow diagram of an example of a method 300 estimating fluid parameters inside tumors carried out according to the principles of the disclosure. The method 300 is a non-invasive method that does not use imaging contrast agents. At least some of the steps of the method 300 are performed by a processor, such as the processor 230. The processor can be directed to perform the steps by a computer program product. The method 300 can be carried out by a tumor parameter estimator such as disclosed herein; for example, the tumor parameter estimator 200. The method 300 begins in a step 305.

In a step 310, image data are received from a tumor, such as from a tumor sample or a tissue sample of a human or animal having a tumor. The image data can be obtained from an ultrasound scan. In other examples, image data can be obtained from another type of imaging method, such as MRI or photoacoustic imaging.

In a step 320 strain data of the tumor are obtained from the imaging data. The strain data can be estimated from the image data via conventional methods such as sample tracking, correlation, optical flow estimation, block matching, Doppler-based processing, etc. In some examples, the strain data is obtained from multiple images of the tumor at different times.

In a step 330 a tumor parameter inside the cancer tumor is determined employing the strain data and an analytical model. The tumor parameter can be IFP. The tumor parameter can also be IFV. The analytical model can be, for example, represented by Equation 2.

The tumor parameter is then employed in a medical or research process in a step 340. The tumor parameter can be provided to a user for application in various medical or research processes. The user can be a clinician, doctor, researcher, technician, imaging expert, nurse, or other medical or research personnel. The tumor parameter can be provided to a user or users by various user interfaces. For example, a visual display can be used. The different processes include the diagnosis, prognosis and treatment of cancers. IFP can be used, for example, to monitor growth and metastasis, and IFV can be used to measure the effectiveness of drug delivery therapies in the cancer. The method 300 continues to step 350 and ends.

Figure 4:
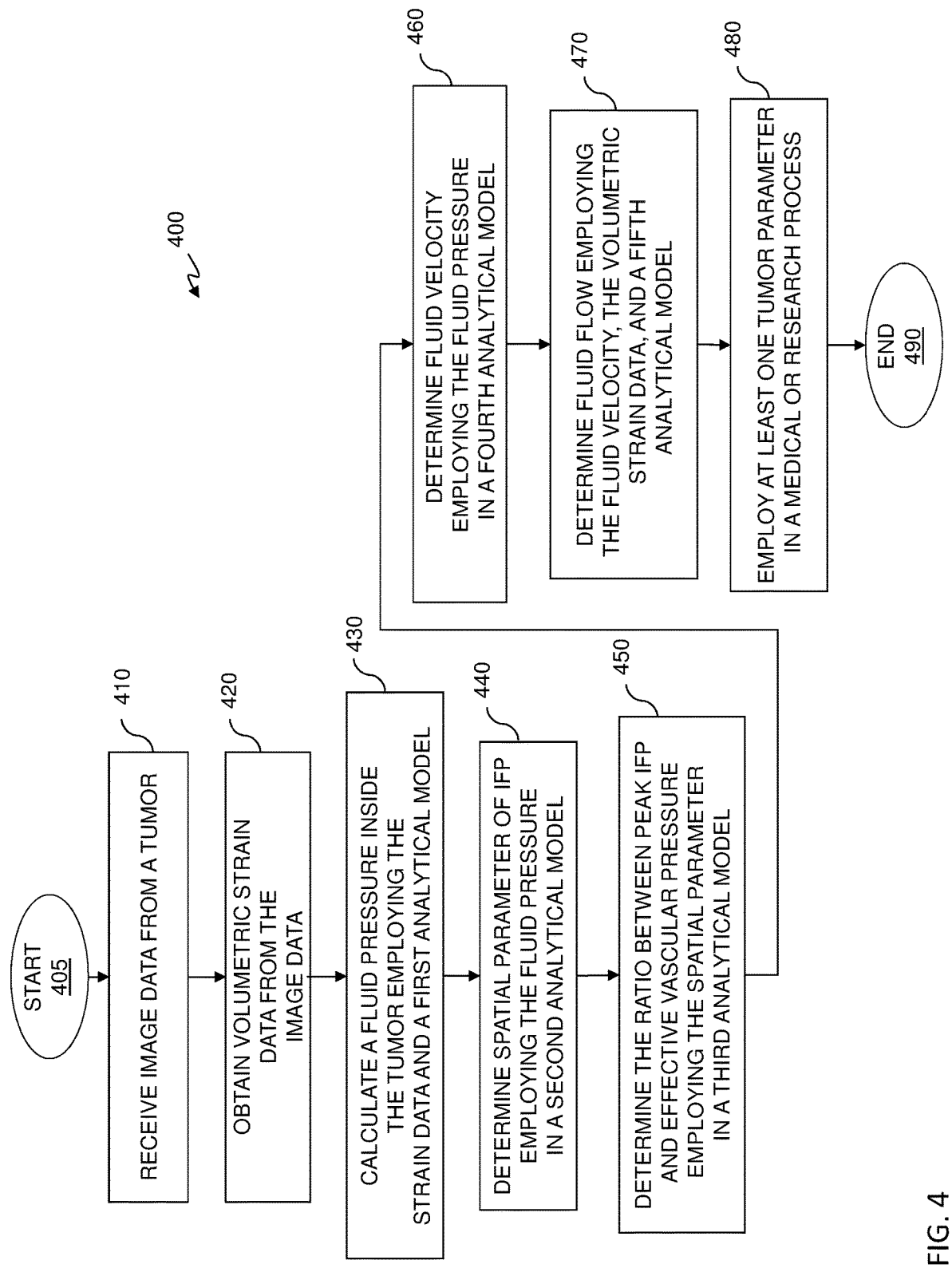
FIG. 4 illustrates a flow diagram of an example of a method that includes estimating parameters inside tumors carried out according to the principles of the disclosure.

FIG. 4 illustrates a flow diagram of an example of a method 400 for estimating parameters inside tumors carried out according to the principles of the disclosure. The method 400 is a non-invasive method that does not use imaging contrast agents. At least some of the steps of the method 400 are performed by a processor, such as the processor 230 of FIG. 2. The processor can be directed to perform the steps by a computer program product. The method 400 can be carried out by a tumor parameter estimator such as disclosed herein. The method 400 begins in a step 405.

In a step 410, data is received from a tumor, such as a tumor sample or a tissue sample from a human or animal host having a tumor. The data can be obtained from an ultrasound scan or another imaging method.

In a step 420 strain data of the tumor is obtained from the imaging data. The strain data can be, for example, volumetric strain data. The strain data can be obtained from the image data via conventional methods such as sample tracking, correlation, optical flow estimation, block matching, Doppler-based processing, etc.

In a step 430 compression induced fluid pressure inside the tumor is determined employing the strain data and an analytical model. The analytical model can be represented by Equation 4. For determining the fluid pressure, the volumetric strain can be calculated at two different times according to Equation 4.

In a step 440, a spatial parameter of IFP a is determined employing the fluid pressure in a second analytical model. The second analytical model can be represented by Equation 5. A curve fitting algorithm can be used to solve for a. In some examples, the $\alpha$ and a peak fluid pressure can be made floating when using the curve fitting algorithm.

In addition to solving for a, other parameters can also be determined employing the volumetric strain data and analytical models. The method 400 can continue to step 450 where the ratio between peak IFP and effective vascular pressure is determined employing the $\alpha$ in a third analytical model. The third analytical model can be represented by Equation 6. Additionally, in a step 460 fluid velocity can be determined employing the fluid pressure in a fourth analytical model, such as represented by Equation 7. Fluid flow can be calculated employing the fluid velocity, the volumetric strain data, and a fifth analytical model in a step 470. The fifth analytical model can be represented by Equation 8.

At least one tumor parameter is then employed in a medical or research process in a step 480. The tumor parameter (or parameters) can be employed similarly to step 340 in method 300. The method 400 ends in a step 490.

A portion of the above-described apparatus, systems or methods may be embodied in or performed by various analog or digital data processors or computers, wherein the computers are programmed or store executable programs of sequences of software instructions to perform one or more of the steps of the methods. The software instructions of such programs may represent algorithms and be encoded in machine-executable form on non-transitory digital data storage media, e.g., magnetic or optical disks, random-access memory (RAM), magnetic hard disks, flash memories, and/or read-only memory (ROM), to enable various types of digital data processors or computers to perform one, multiple or all of the steps of one or more of the above-described methods, or functions, systems or apparatuses described herein.

The digital data processors or computers can be comprised of one or more GPUs, one or more CPUs, one or more of other processor types, or a combination thereof. The digital data processors and computers can be located proximate each other, proximate a user, in a cloud environment, a data center, or located in a combination thereof. For example, some components can be located proximate the user and some components can be located in a cloud environment or data center. In one example, the digital data processors or computers can be, or be part of, a lab device or lab equipment.

Portions of disclosed embodiments may relate to computer storage products with a non-transitory computer-readable medium that have program code thereon for performing various computer-implemented operations that embody a part of an apparatus, device or carry out the steps of a method set forth herein. Non-transitory used herein refers to all computer-readable media except for transitory, propagating signals. Examples of non-transitory computer-readable media include, but are not limited to: magnetic media such as hard disks, floppy disks, and magnetic tape; optical media such as CD-ROM disks; magneto-optical media such as floptical disks; and hardware devices that are specially configured to store and execute program code, such as ROM and RAM devices. Examples of program code include both machine code, such as produced by a compiler, and files containing higher level code that may be executed by the computer using an interpreter.

In interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

Those skilled in the art to which this application relates will appreciate that other and further additions, deletions, substitutions and modifications may be made to the described embodiments. It is also to be understood that the terminology used herein is for the purpose of describing particular embodiments only, and is not intended to be limiting, since the scope of the present disclosure will be limited only by the claims. Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, a limited number of the exemplary methods and materials are described herein.

It is noted that as used herein and in the appended claims, the singular forms "a", "an", and "the" include plural referents unless the context clearly dictates otherwise. Those skilled in the art to which this application relates will appreciate that other and further additions, deletions, substitutions and modifications may be made to the described embodiments.

Various aspects of the disclosure can be claimed including the apparatuses, systems, computer program products, and methods as disclosed herein including:

A. A method for estimating tumor parameters, including: (1) receiving image data from a tumor, (2) obtaining strain data of the tumor from the image data, and (3) determining a tumor parameter employing the strain data and an analytical model.

B. A tumor parameter estimator, including: (1) an interface configured to receive image data of a tumor, and (2) a processor configured to calculate tumor parameters inside of the tumor employing strain data determined from the image data of the tumor and an analytical model relating the tumor parameters to the strain data.

C. A system, including: (1) an imaging system configured to acquire image data of a tumor, and (2) a tumor parameter estimator configured to determine tumor parameters inside of the tumor employing strain data determined from the image data and an analytical model relating the tumor parameters to the strain data.

D. A computer program product including a series of operating instructions stored on a non-transitory computer readable medium that directs a processor to perform a method to estimate parameters inside tumors, the method including: (1) receiving image data of a tumor, (2) obtaining strain data of the tumor from the image data, wherein the strain data includes axial, lateral, elevational, or volumetric strain data of the tumor, and (3) determining a tumor parameter employing the strain data in an analytical model that relates the tumor parameters to the strain data.

E. A tumor parameter estimator, including: (1) an interface configured to receive strain data of a tumor, and (2) a processor configured to calculate parameters of the tumor employing the strain data and multiple analytical models.

F. A system, comprising: (1) an imaging system configured to acquire image data of a tumor, and (2) a tumor parameter estimator configured to calculate a compression-induced fluid pressure inside the tumor employing strain data from the image data in a first analytical model and determine parameter α employing the fluid pressure in a second analytical model.

G. A computer program product including a series of operating instructions stored on a non-transitory computer readable medium that directs a processor to perform a method to estimate tumor parameters, the method including: (1) receiving strain data of a tumor, (2) calculating a fluid pressure inside the tumor employing the strain data in a first analytical model, (3) determining spatial parameter α employing the fluid pressure in a second analytical model and calculating a ratio between vascular permeability and interstitial permeability using the parameter α, (4) calculating a ratio between peak IFP and effective vascular pressure employing a third analytical model, (5) estimating the fluid velocity by using compression induced fluid pressure in fourth analytical model, and (6) computing the fluid flow using the strain data in fifth analytical model.

Each of aspects A to G can have one or more of the following additional elements in combination.

Element 1: wherein the tumor parameter is IFP. Element 2: wherein the tumor parameter is IFV. Element 3: wherein the image data is obtained from an ultrasound scan. Element 4: wherein the ultrasound scan is an ultrasound elastography. Element 5: wherein the analytical model is a first analytical model and calculating a compression-induced fluid pressure inside the tumor employing the strain data in a second analytical model, and determining parameter α employing the fluid pressure in a third analytical model. Element 6: wherein the calculating includes determining the strain at multiple times according to the second analytical model. Element 7: wherein the determining includes employing a curve fitting algorithm. Element 8: further comprising determining ratio between peak IFP and effective vascular pressure employing the α in a fourth analytical model. Element 9: further comprising calculating fluid velocity employing the fluid pressure in a fifth analytical model. Element 10: further comprising calculating fluid flow employing the fluid velocity, the strain data, and a sixth analytical model. Element 11: wherein the image data is acquired by an imaging system and the tumor parameter estimator is integrated with the imaging system. Element 12: wherein the imaging system and the tumor parameter estimator are integrated in a single computing device. Element 13: wherein the strain data are axial, lateral, elevational, or volumetric strain data. Element 14: wherein the analytical model relates the tumor parameters to the strain data. Element 15: wherein the processor is configured to calculate a fluid pressure inside the tumor employing the strain data in a first analytical model and determine parameter α employing the fluid pressure in a second analytical model. Element 16: wherein the processor is configured to calculate the fluid pressure by determining the strain at multiple times according to the first analytical model. Element 17: wherein the processor is configured to determine α employing a curve fitting algorithm. Element 18: wherein the processor is further configured to determine a ratio between peak IFP and effective vascular pressure employing the α in a third analytical model. Element 19: wherein the processor is further configured to calculate fluid velocity employing the fluid pressure in a fourth analytical model. Element 20: wherein the processor is further configured to calculate fluid flow employing the strain data, and a fifth analytical model. Element 21: further comprising determining a ratio between vascular permeability and interstitial permeability employing the α. Element 22: wherein the strain data is obtained from image data of the tumor.

What is claimed is:
1. A method for estimating tumor parameters, comprising:
generating, using an ultrasound device, radio frequency (RF) signals from a compressed tumor at different times;
acquiring, from the RF signals, strain data of the tumor for each of the different times when the tumor is at steady state, wherein the strain data includes one or more of axial, lateral, elevational, or volumetric strain data;
determining, for each of the different times, one or more tumor fluid transport parameters of the tumor by solving one or more equations employing the strain data and a processor, wherein the one or more fluid transport tumor parameters includes interstitial fluid pressure (IFP) and the one or more equations include a first equation that represents the IFP as a difference between volumetric stress inside the tumor and a product of the effective compression modulus $K_e$ and the volumetric strain inside the tumor, wherein the effective compression modulus $K_e$ is determined using the axial and the lateral strain of the strain data; and
monitoring growth or metastasis of the tumor over the different times using the IFP determined for each of the different times and the strain data acquired from the RF signals of the ultrasound device.

2. The method as recited in claim 1, wherein the ultrasound system is an ultrasound poroelastography system.

3. The method as recited in claim 1, wherein the one or more tumor fluid transport parameters includes interstitial fluid velocity (IFV) and the one or more equations includes a second equation that represents the IFV as a gradient of the IFP of the tumor along a radial direction.

4. The method as recited in claim 2, further comprising compressing the tumor when obtaining the RF signals using the ultrasound poroelastography system.

5. The method as recited in claim 1 wherein the one or more equations further include a third equation that relates at least one of fluid pressure, fluid velocity, and fluid flow determined from the RF signals with the one or more tumor fluid transport parameters.

6. The method as recited in claim 1, wherein the one or more tumor fluid transport parameters includes a compression-induced fluid pressure inside the tumor and the one or more equations include a fourth equation that represents
the compression-induced fluid pressure using a product of a compression modulus K and a difference between the volumetric strain at a specific time and at steady state.

7. The method as recited in claim 6, wherein the one or more tumor fluid transport parameters includes spatial parameter α and the one or more equations include a fifth equation that represents the spatial parameter α using the compression-induced fluid pressure, a radius of the tumor, vascular permeability of the tumor, interstitial permeability of the tumor, and a ratio of a surface area to a volume of the tumor.

8. The method as recited in claim 6 wherein solving the fifth equation includes employing a curve fitting algorithm.

9. The method as recited in claim 7 further comprising determining a ratio between the vascular permeability and the interstitial permeability employing the spatial parameter α.

10. The method as recited in claim 7, further comprising determining a ratio between peak interstitial fluid pressure (IFP) and effective vascular pressure employing a fourth analytical model that represents the ratio as one minus the spatial parameter α and a cosec of the spatial parameter α.

11. The method as recited in claim 6 further comprising calculating fluid velocity employing a sixth equation of the one or more equations that represents the fluid velocity as a change in fluid pressure.

12. The method as recited in claim 11 further comprising calculating fluid flow employing a seventh equation of the one or more equations that represents the fluid flow as a change in the fluid velocity and the strain data.

13. A diagnostic device for monitoring tumors, comprising:
an interface configured to receive radio frequency (RF) signals of a tumor, wherein the RF signals are obtained at different times using an ultrasound system when the tumor is at steady state; and
a processor configured to perform operations that include:
acquiring, from the RF signals, strain data of the tumor for each of the different times, wherein the strain data includes one or more of axial, lateral, elevational, or volumetric strain data;
determining, for each of the different times, one or more tumor fluid transport parameters of the tumor by solving one or more equations employing the strain data and a processor, wherein the one or more fluid transport tumor parameters includes interstitial fluid pressure (IFP) and the one or more equations include a first equation that represents the IFP as a difference between volumetric stress inside the tumor and a product of the effective compression modulus $K_e$ and the volumetric strain inside the tumor, wherein the effective compression modulus $K_e$ is determined using the axial and the lateral strain of the strain data; and
monitoring growth or metastasis of the tumor over the different times using the IFP determined for each of the different times and the strain data acquired from the RF signals of the ultrasound system.

14. The diagnostic device as recited in claim 13 wherein the ultrasound system is an ultrasound poroelastography system.

15. The diagnostic device as recited in claim 13 wherein the effective compression modulus $K_e$ is determined using the axial and the lateral strain of the strain data.

16. The diagnostic device as recited in claim 14 wherein the tumor is compressed when obtaining the RF signals using the ultrasound poroelastography system.

17. A system, comprising:
an ultrasound system configured to obtain radio frequency (RF) signals from a compressed tumor at different times; and
a processor configured to perform operations that include:
acquiring, from the RF signals, strain data of the tumor for each of the different times when the tumor is at steady state, wherein the strain data includes one or more of axial, lateral, elevational, or volumetric strain data; and
determining, for each of the different times, one or more tumor fluid transport parameters of the tumor by solving one or more equations employing the strain data and a processor, wherein the one or more fluid transport tumor parameters includes interstitial fluid pressure (IFP) and the one or more equations include a first equation that represents the IFP as a difference between volumetric stress inside the tumor and a product of the effective compression modulus $K_e$ and the volumetric strain inside the tumor, wherein the effective compression modulus $K_e$ is determined using the axial and the lateral strain of the strain data; and
a display configured to visually present the one or more tumor fluid transport parameters.

18. The system as recited in claim 17 wherein the effective compression modulus $K_e$ is determined using the axial and the lateral strain of the strain data.

19. The system as recited in claim 17 wherein determining the one or more tumor fluid transport parameters further includes determining interstitial fluid velocity (IFV) by representing the IFV as a gradient of the IFP of the tumor along a radial direction.

20. The system as recited in claim 17, wherein the ultrasound system is an ultrasound poroelastography system and the operations further include monitoring growth or metastasis of the tumor over the different times using the IFP determined for each of the different times and the strain data acquired from the RF signals of the ultrasound poroelastography system.

* * * * *